United States Patent
Choe et al.

(10) Patent No.: US 6,550,059 B1
(45) Date of Patent: Apr. 15, 2003

(54) METHOD FOR GENERATING OPTIMIZED VECTOR INSTRUCTIONS FROM HIGH LEVEL PROGRAMMING LANGUAGES

(75) Inventors: Gwangwoo "Johnny" Choe, Austin, TX (US); James R. MacDonald, Buda, TX (US); Paul B. Mann, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/412,030

(22) Filed: Oct. 4, 1999

(51) Int. Cl.[7] .................................................. G06F 9/45
(52) U.S. Cl. ...................... 717/159; 717/149; 717/154
(58) Field of Search ............................... 717/159, 161, 717/154, 149

(56) References Cited

U.S. PATENT DOCUMENTS

| | | | | |
|---|---|---|---|---|
| 4,821,181 A | * | 4/1989 | Iwasawa et al. ............. 717/119 |
| 5,293,631 A | * | 3/1994 | Rau et al. .................... 717/146 |
| 5,442,790 A | * | 8/1995 | Nosenchuck ................ 717/146 |
| 5,452,461 A | * | 9/1995 | Umekita et al. ............. 717/149 |
| 5,551,039 A | | 8/1996 | Weinberg et al. ............ 717/154 |
| 5,588,152 A | * | 12/1996 | Dapp et al. ................... 712/16 |
| 5,710,935 A | * | 1/1998 | Barker et al. ................. 712/20 |
| 5,734,921 A | * | 3/1998 | Dapp et al. ................... 712/10 |
| 5,774,727 A | * | 6/1998 | Walsh et al. ................. 717/150 |
| 5,842,022 A | * | 11/1998 | Nakihira et al. ............. 717/154 |
| 5,946,496 A | * | 8/1999 | Sugumar et al. ............ 711/157 |
| 5,966,537 A | * | 10/1999 | Rivichandran .............. 717/158 |
| 6,016,395 A | * | 1/2000 | Mohamed .................... 717/149 |

OTHER PUBLICATIONS

Huelsbergen et al., Dynamic Program Parallelization, ACM, 1992, p. 311–323.*

* cited by examiner

*Primary Examiner*—Tuan Q. Dam
*Assistant Examiner*—John Q. Chavis
(74) *Attorney, Agent, or Firm*—Meyertons, Hood, Kivlin, Kowert, & Goetzel, P.C.; B. Noël Kivlin (57) ABSTRACT

A method for compiling source code to produce vector instructions, wherein parallel operands are placed in adjacent locations in memory and wherein the realignment of the operands is minimized. One embodiment generates two-element vector instructions from generalized (e.g., non-loop) source instructions. Memory locations are assigned to the corresponding operands based on the operations which are selected for parallel execution, so that parallel operations operate on data which are adjacent in memory. The memory locations are assigned in a way which minimizes realignment of the data (i.e., swapping positions of two operands.) Another embodiment comprises a software program (e.g., a vectorizing compiler) which examines a block of program code, analyzes the operators within the code and generates vectorized code in accordance with the foregoing method.

19 Claims, 7 Drawing Sheets

METHOD FOR GENERATING OPTIMIZED VECTOR INSTRUCTIONS FROM HIGH LEVEL PROGRAMMING LANGUAGES

BACKGROUND OF THE INVENTION

1. Field of the Invention

This invention is related generally to the field of computer systems and more particularly to generating optimized vector instructions from high level programming languages.

2. Description of the Related Art

High performance microprocessors use a variety of techniques to increase their performance. These techniques are designed to allow the microprocessors to execute a greater number of instructions per unit of time. One well-known technique is pipelining. Pipelined microprocessors execute instructions in stages, so that an initial stage of execution of one instruction can be performed while a subsequent stage of execution of an earlier instruction is performed. In this manner, portions of the execution of successive instructions are performed in parallel.

The use of pipelining techniques to increase parallelism in the execution of program instructions does have several drawbacks, however. Because some instructions in a program depend on instructions which precede it in program order, the instruction cannot be executed until the results of the preceding instructions are available. These dependencies may include data dependencies and control dependencies. (These dependencies are well known in the art and will not be described in detail here.) In a pipelined microprocessor, the number of dependencies in the pipeline increases as the depth of the pipeline increases, potentially causing more stalling of the microprocessor and thereby reducing its efficiency. Additionally, as the speed of a pipelined microprocessor is increased, it becomes more and more difficult to fetch and decode instructions rapidly enough to fill the pipeline. This may create a bottleneck in the microprocessor.

Another technique for increasing the performance of a microprocessor is to configure the microprocessor to perform vector processing. Vector processing consists of performing an operation on an array of data rather than on a single datum. For example, where a non-vector microprocessor might multiply a first value by a second value to produce a third value, a vector microprocessor would multiply a first array of values times a second array of values to produce a third array of values. Thus, a single vector operation on one or more n-element vectors (i.e. arrays) can replace an n-iteration loop which executes a non-vector operation.

Vector operations can have a number of advantages over non-vector operations. As indicated above, a single vector instruction can specify the same calculations as a loop executing a non-vector instruction. As a result, fewer instructions need to be fetched and decoded, thereby eliminating a potential bottleneck in the microprocessor. Control hazards which may be generated in a loop are also eliminated. Further, execution of the specified operation on each element of the vector is independent of the other elements. Therefore, execution of the vector operation does not create data hazards at runtime. Still further, if the vector operation involves a memory access, the access pattern is typically well-defined and, since the entire vector is accessed at once, the latency of the access may be reduced.

If a loop will perform many iterations, it is clear that larger vectors will tend to maximize the benefit of the vector operations. In other words, the more operations that can be processed as a single vector instruction, the better. Much of the development of vector processors has therefore focused on vectors having a relatively large number of elements (e.g., eight or sixteen.) Further, the development of compilers which vectorize software programs have focused on the conversion of loops to one or more vector instructions. For example, if a vector processor handles eight-element vectors, a 50-iteration loop can be processed as seven vector instructions (six operating on full eight-element vectors, and one operating on vectors having only two valid elements.)

A number of factors have caused the vectorization of non-loop instructions to remain largely undeveloped. One of these factors is that the values used in vector operations should be "paired" (adjacent in memory.) As indicated above, instructions within loops typically have well-ordered memory addresses and well-defined access patterns. Non-loop instructions, however, typically are not so ordered. Another of these factors is that the realignment of the elements in the vectors should be minimized and, while looped instructions typically repetitively access data in the same order, the order in which non-loop instructions access data may vary widely. The optimization of generalized instructions (including non-loop instructions) has therefore been quite difficult.

It should be noted that generalized parallel processing systems do not solve these problems in generating vectorized code. While generalized parallel processing systems are intended to maximize the number of operations performed in parallel, it is not necessary for these systems to manage the storage of data. In other words, it is not necessary to store and retrieve data in a way which is convenient for vector operations (e.g., storing vector data in adjacent memory locations or re-aligning vector data.)

SUMMARY OF THE INVENTION

One or more of the problems described above may be solved by the various embodiments of the invention. Broadly speaking, the invention comprises a method for vectorizing code. One embodiment comprises a method for compiling source code to produce vector instructions. The method vectorizes non-loop source code instructions as well as instructions which form loops in the source code. The method is directed to two-element vectorization (i.e., selecting pairs of operations for execution in parallel.) Because two operations are executed in parallel (rather than a larger number,) the method is well-suited to maximize the number of operations performed in parallel in many different types of code. Based on the operations which are selected for parallel execution, memory locations are assigned to the corresponding operands so that parallel operations operate on data which are adjacent in memory. The memory locations are assigned in a way which minimizes realignment of the data (i.e., swapping positions of two operands.) Another embodiment comprises a software program (e.g., a vectorizing compiler) which examines a block of program code, analyzes the operators within the code and generates vectorized code in accordance with the foregoing method. Many additional environments are possible, and will be apparent to persons of skill in the art of the invention.

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

In one embodiment of the invention, instructions are vectorized for a processor which is configured to execute two-way vector instructions. That is, the processor can perform two identical operations in parallel using one or more vectors, each of which contains two data elements. For example, a vector instruction may load two values, add two values or assign two values to corresponding variables. The source code instructions of a program are scanned to determine the operations performed by the instructions, the dependencies between the instructions, and the suitability of the instructions for execution in parallel. Object code which combines selected pairs of the source code instructions into vector instructions is then produced.

One embodiment of the invention will be described in detail below. It should be noted that many modifications of the described embodiment are possible and will be obvious to a person of ordinary skill upon reading this disclosure. For example, while the following embodiment selects pairs of operations for execution in parallel, other embodiments might select more than two operations for parallel execution. While some of these modifications will be described below, all of the various embodiments of the invention are intended to be encompassed by this disclosure and the appended claims.

Figure 1:
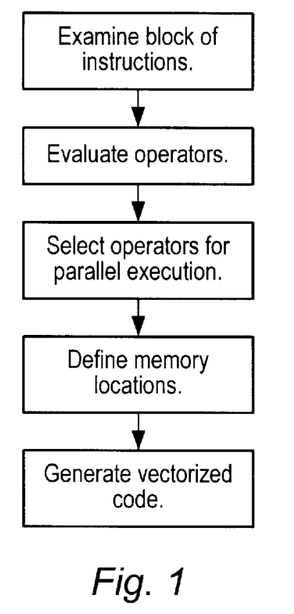
FIG. 1 is a flow diagram of the method in one embodiment.

Referring to FIG. 1, one embodiment comprises a method for vectorizing program code. Generally, the method comprises examining a block of instructions, evaluating the operators within the instructions, selecting operators for parallel execution, defining memory locations for the corresponding operands and generating vectorized code.

Figure 2:
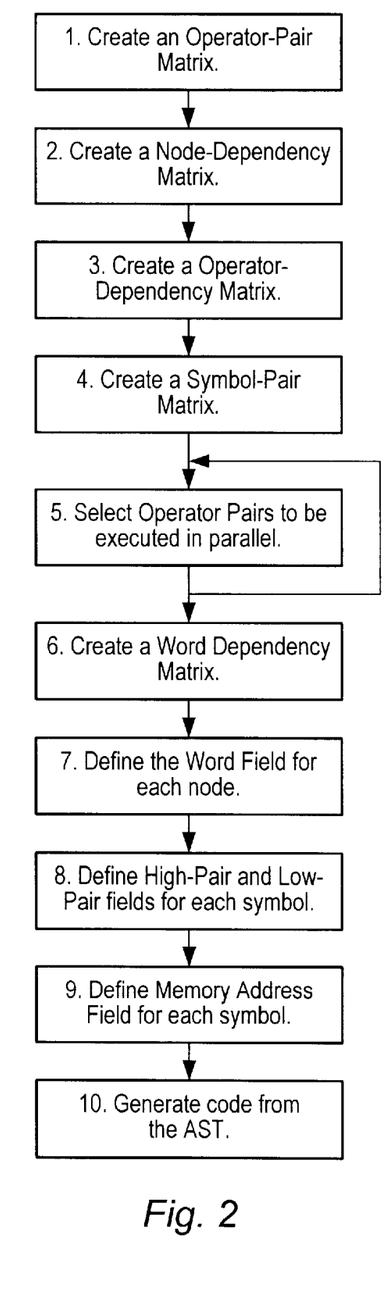
FIG. 2 is a flow diagram of the method in one embodiment.

Referring to FIG. 2, one embodiment is directed to a method for selecting operations embodied in a source code program and converting those operations into two-element vector instructions. It should be noted that this embodiment of the method is illustrative and that the described steps may be combined or subdivided in other embodiments. The steps of the method are as follows:

create an operator pair matrix;

create a node dependency matrix;

create an operator dependency matrix;

create a symbol pair matrix;

select operator pairs to be executed in parallel (execute this step twice);

create a word dependency matrix;

define the word field for each node;

define high-pair and low-pair fields for each symbol;

define memory address field for each symbol; and generate code from abstract syntax tree.

This embodiment utilizes the following data structures:

an abstract syntax tree;

a symbol table;

an operator pair matrix;

an operator dependency matrix;

a node dependency matrix;

a symbol pair matrix;

a word dependency matrix;

an operator availability array;

an operator descendants array; and an operator ancestors array.

It may be useful to describe the invention in relation to a particular source code example. Take, for instance, the simple program:

```
main( )
{
    f = (a+b) + (c+d);
    g = (a+c) + (b+d);
}
```

Unless otherwise indicated, the following description of the method will use the symbols and operators of this example to illustrate the particular data structures and steps. (It should be noted that, although this example uses a very small piece of source code, the same method can be used on larger pieces of code by examining one block of code at a time.)

Figure 3:
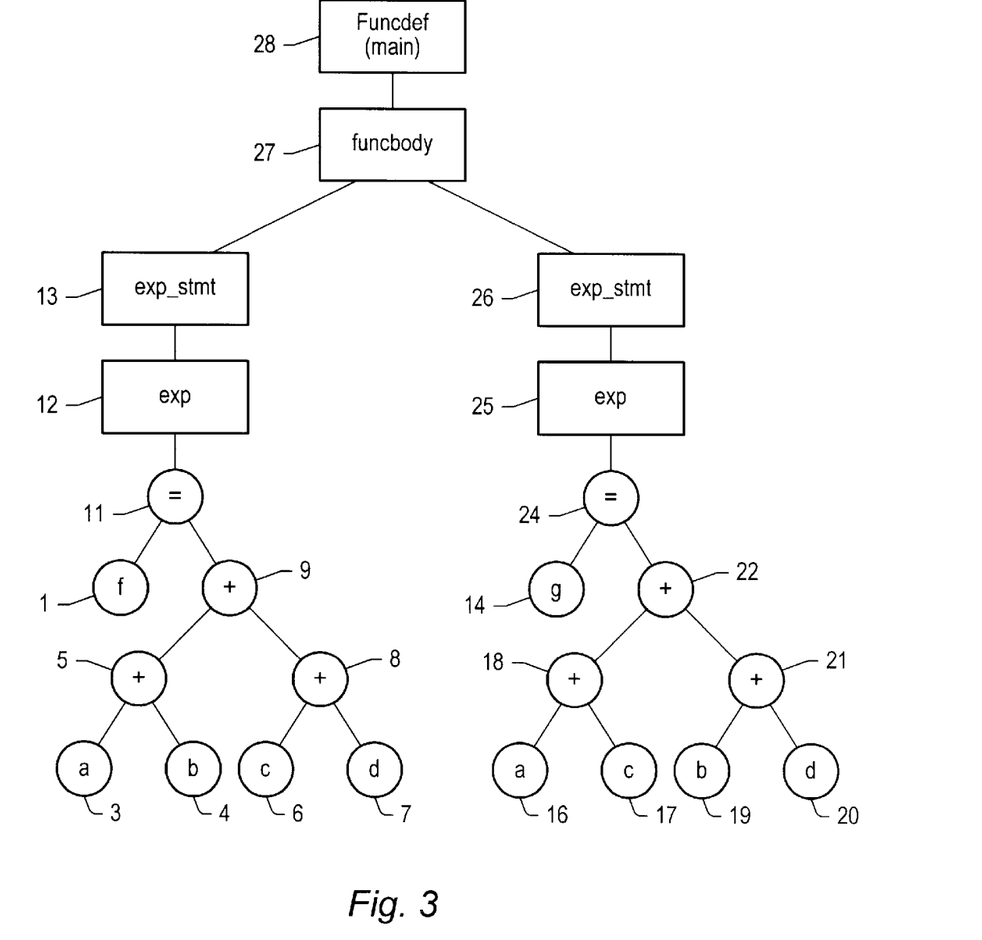
FIG. 3 is a graphical representation of an abstract syntax tree corresponding to the example program.

Although not shown in FIG. 2 as a separate step, an abstract syntax tree is created from the source code. The abstract syntax tree is a representation of the structure of the operators defined by the source code. The abstract syntax tree for this source code example can be represented graphically as shown in FIG. 3. The reference numerals of FIG. 3 correspond to the node numbers used in the description below. The abstract syntax tree can also be represented textually as follows:

|  | Node |
|---|---|
| + funcdef(main) | 28 |
|   + funcbody | 27 |
|     + exp_stmt | 13 |
|       + exp | 12 |
|         + assign1 | 11 |
|           + leftside | 2 |
|             + ident(f) | 1 |
|           + rightside | 10 |
|             + add | 9 |
|               + add | 5 |

-continued

| | Node |
|---|---|
|     |    | + ident(a) | 3 |
|     |    | + ident(b) | 4 |
|     |    + add | 8 |
|     |        + ident(c) | 6 |
|     |        + ident(d) | 7 |
| + exp_stmt | 26 |
|   + exp | 25 |
|     + assign1 | 24 |
|       + leftside | 15 |
|       | + ident(g) | 14 |
|       + rightside | 23 |
|         + add | 22 |
|           + add | 18 |
|           | + ident(a) | 16 |
|           | + ident(c) | 17 |
|           + add | 21 |
|             + ident(b) | 19 |
|             + ident(d) | 20 |

In addition to the tree structure itself, these representations of the abstract syntax tree include node numbers which are assigned to the nodes and leaves of the tree. In the textual representation, the number of a particular node is on the same line as the node. In FIG. 3, the node numbers are shown as reference numerals. The reference numerals of FIG. 3 correspond to the node numbers shown in the textual representation above. It can be seen from FIG. 3 that the nodes are numbered in the order of their evaluation. Graphically, this corresponds to starting with the leftmost leaf of the tree and working up the tree until a dependency on an unnumbered node is encountered. ("Leaves" are nodes which do not depend on any lower nodes in the tree.)

The dependency of the operations upon the variables and other operations can easily be seen from either of these representations of the abstract syntax tree. The particular types of operations and the particular variables involved in the operations can also be easily identified. The information in the abstract syntax tree is then used as the basis for building the other data structures used in the method.

As shown in FIG. 2, the first step in the method is to create an operator pair matrix. The operator pair matrix identifies those operations which can be paired together for parallel execution. In other words, they perform identical operations. The operator pair matrix for the example source code above is as follows:

| | | Node | | | | | | |
|---|---|---|---|---|---|---|---|---|
| | | 5 | 8 | 9 | 1 8 | 2 1 | 2 2 | 1 1 | 2 4 |
| | | | | | Col | | | | |
| Node | Row | 1 | 2 | 3 | 4 | 5 | 6 | 7 | 8 |
| 5 | 1 | . | 1 | 1 | 1 | 1 | 1 | . | . |
| 8 | 2 | . | . | 1 | 1 | 1 | 1 | . | . |
| 9 | 3 | . | . | . | 1 | 1 | 1 | . | . |
| 18 | 4 | . | . | . | . | 1 | 1 | . | . |
| 21 | 5 | . | . | . | . | . | 1 | . | . |
| 22 | 6 | . | . | . | . | . | . | . | . |
| 11 | 7 | . | . | . | . | . | . | . | 5 |
| 24 | 8 | . | . | . | . | . | . | . | . |

The matrix in this instance is an eight by eight square matrix. Rows 1–8 correspond to nodes 5, 8, 9, 18, 21, 22, 11 and 24, respectively. The columns of the matrix have this same correspondence. The operator pair matrix is initialized with zeros in each entry. (Since the information below the diagonal from row 1, column 1, to row 8, column 8 is duplicative of the information above the diagonal, only half of the matrix will be filled in.) Then, for each pair of nodes, a number is entered to indicate the compatibility of the operators at those nodes.

It can be seen from the foregoing operator pair matrix for the example source code, the operator at node 5 (row 1) might be equally well paired with nodes 8, 9, 18, 21 and 22 (columns 2–6, respectively.) The operator of node 11, on the other hand, matches only the operator of node 24, as indicated by the "5" in row 7, column 8. If the entry corresponding to a particular pair of nodes is zero (represented in the table by "." for clarity,) the operators cannot be paired in a single vector instruction. If the entry corresponding to the pair of nodes is greater than, or equal to one, the nodes may be paired, depending on an evaluation of the pair, as will be described below.

In one embodiment, the operator pair matrix (and other data structures) are statically implemented by allocating a predetermined amount of memory (e.g., a 256-by-256 element array.) This type of static implementation runs very quickly, but it may waste resources by allocating resources and then not using them. In the example above, for instance, only eight operators are identified, so all but a very small fraction of a 256-by-256 element array would be unused. Other embodiments may use dynamic allocation to more efficiently allocate the available resources. For example, instead of simply allocating a static n-by-n array, a two-dimensional linked list may be used, wherein additional elements of the list may be allocated as needed. This approach makes more efficient use of memory resources, but does so at the expense of speed. It is contemplated that various embodiments may use static or dynamic allocation schemes (or combinations of both) to implement data structures as necessary to meet their respective application requirements.

The second step in the method is creating a node dependency matrix. The node dependency matrix is an n-by-n matrix, where n is the number of nodes in the abstract syntax tree. The node dependency matrix is initialized with immediate dependencies and then a transitive closure algorithm is performed to determine whether there are any extended dependencies between nodes (i.e., one of the nodes under consideration is dependent on the other, but they are separated by at least one additional node.) The node dependency matrix is initialized by traversing the abstract syntax tree in order of program execution to determine the dependencies between connected nodes of the abstract syntax tree (i.e., nodes attached to a single branch in the abstract syntax tree.) Dependencies between operators in the same expression are thereby noted. At the same time, the symbol values are tracked in the symbol table using the last-assignment-node field of the table. (Symbol tables are well-known in the programming arts and will not be described in more detail herein.) This identifies dependencies between operators in different expressions which use the same variables.

The initialized node dependency matrix identifies at least immediate dependencies (i.e. dependencies between nodes which are connected by a single branch.) By performing a transitive closure algorithm on the initialized matrix, the remainder of the dependencies will be identified. "Transitive closure" algorithms are used to determine whether, based on an adjacency matrix, two points or vertices in the matrix are connected. This is equivalent, in this instance, to determining whether there is a dependency between these two points.

An algorithm such as Warshall's algorithm performs transitive closure as follows:

start with adjacency matrix T(i,j), where T is an n-by-n matrix representing a set of n elements;
  for each J from 1 to n,
    for each i from 1 to n,
      if T(i,j)=1, then OR row i and row j and place the result in row i.

Taking the example above, the initialized node dependency matrix would look like this:

ancestors of node 4, and node 4 is one of the descendants of each of these nodes. It can be seen from the matrix that the group of nodes 1–13 has no dependencies with nodes 14–26.

The third step in the method is to create an operator dependency matrix. The operator dependency matrix is initialized by copying the node dependency matrix into it. The rows and columns corresponding to nodes which are not operators are then eliminated from the matrix.

| Node | Row | Node Col. | 3 1 | 4 2 | 6 3 | 7 4 | 5 5 | 8 6 | 9 7 | 1 8 | 11 9 | 12 10 | 13 11 | 16 12 | 17 13 | 19 14 | 20 15 | 18 16 | 21 17 | 22 18 | 14 19 | 24 20 | 25 21 | 26 22 |
|---|---|---|---|---|---|---|---|---|---|---|---|---|---|---|---|---|---|---|---|---|---|---|---|---|
| 3 | 1 | | . | . | . | . | 1 | . | . | . | . | . | . | . | . | . | . | . | . | . | . | . | . | . |
| 4 | 2 | | . | . | . | . | 1 | . | . | . | . | . | . | . | . | . | . | . | . | . | . | . | . | . |
| 6 | 3 | | . | . | . | . | . | 1 | . | . | . | . | . | . | . | . | . | . | . | . | . | . | . | . |
| 7 | 4 | | . | . | . | . | . | 1 | . | . | . | . | . | . | . | . | . | . | . | . | . | . | . | . |
| 5 | 5 | | . | . | . | . | . | . | 1 | . | . | . | . | . | . | . | . | . | . | . | . | . | . | . |
| 8 | 6 | | . | . | . | . | . | . | 1 | . | . | . | . | . | . | . | . | . | . | . | . | . | . | . |
| 9 | 7 | | . | . | . | . | . | . | . | . | 1 | . | . | . | . | . | . | . | . | . | . | . | . | . |
| 1 | 8 | | . | . | . | . | . | . | . | . | 1 | . | . | . | . | . | . | . | . | . | . | . | . | . |
| 11 | 9 | | . | . | . | . | . | . | . | . | . | 1 | . | . | . | . | . | . | . | . | . | . | . | . |
| 12 | 10 | | . | . | . | . | . | . | . | . | . | . | 1 | . | . | . | . | . | . | . | . | . | . | . |
| 13 | 1 | | . | . | . | . | . | . | . | . | . | . | . | . | . | . | . | . | . | . | . | . | . | . |
| 16 | 2 | | . | . | . | . | . | . | . | . | . | . | . | . | . | . | 1 | . | . | . | . | . | . | . |
| 17 | 3 | | . | . | . | . | . | . | . | . | . | . | . | . | . | . | 1 | . | . | . | . | . | . | . |
| 19 | 4 | | . | . | . | . | . | . | . | . | . | . | . | . | . | . | . | 1 | . | . | . | . | . | . |
| 20 | 5 | | . | . | . | . | . | . | . | . | . | . | . | . | . | . | . | 1 | . | . | . | . | . | . |
| 18 | 6 | | . | . | . | . | . | . | . | . | . | . | . | . | . | . | . | . | 1 | . | . | . | . | . |
| 21 | 7 | | . | . | . | . | . | . | . | . | . | . | . | . | . | . | . | . | 1 | . | . | . | . | . |
| 22 | 8 | | . | . | . | . | . | . | . | . | . | . | . | . | . | . | . | . | . | . | 1 | . | . | . |
| 14 | 9 | | . | . | . | . | . | . | . | . | . | . | . | . | . | . | . | . | . | . | 1 | . | . | . |
| 24 | 20 | | . | . | . | . | . | . | . | . | . | . | . | . | . | . | . | . | . | . | . | . | 1 | . |
| 25 | 1 | | . | . | . | . | . | . | . | . | . | . | . | . | . | . | . | . | . | . | . | . | . | 1 |
| 26 | 2 | | . | . | . | . | . | . | . | . | . | . | . | . | . | . | . | . | . | . | . | . | . | . |

Then, after performing transitive closure on the matrix, it would look like this:

The rows of the operator dependency matrix are individually summed to create an array of values representing the

| Node | Row | Node Col. | 3 1 | 4 2 | 6 3 | 7 4 | 5 5 | 8 6 | 9 7 | 1 8 | 11 9 | 12 10 | 13 11 | 16 12 | 17 13 | 19 14 | 20 15 | 18 16 | 21 17 | 22 18 | 14 19 | 24 20 | 25 21 | 26 22 |
|---|---|---|---|---|---|---|---|---|---|---|---|---|---|---|---|---|---|---|---|---|---|---|---|---|
| 3 | 1 | | . | . | . | . | 1 | . | 1 | . | 1 | 1 | 1 | . | . | . | . | . | . | . | . | . | . | . |
| 4 | 2 | | . | . | . | . | 1 | . | 1 | . | 1 | 1 | 1 | . | . | . | . | . | . | . | . | . | . | . |
| 6 | 3 | | . | . | . | . | 1 | 1 | 1 | . | 1 | 1 | 1 | . | . | . | . | . | . | . | . | . | . | . |
| 7 | 4 | | . | . | . | . | 1 | 1 | 1 | . | 1 | 1 | 1 | . | . | . | . | . | . | . | . | . | . | . |
| 5 | 5 | | . | . | . | . | . | . | 1 | . | 1 | 1 | 1 | . | . | . | . | . | . | . | . | . | . | . |
| 8 | 6 | | . | . | . | . | . | . | 1 | . | 1 | 1 | 1 | . | . | . | . | . | . | . | . | . | . | . |
| 9 | 7 | | . | . | . | . | . | . | . | . | 1 | 1 | 1 | . | . | . | . | . | . | . | . | . | . | . |
| 1 | 8 | | . | . | . | . | . | . | . | . | 1 | 1 | 1 | . | . | . | . | . | . | . | . | . | . | . |
| 11 | 9 | | . | . | . | . | . | . | . | . | . | 1 | 1 | . | . | . | . | . | . | . | . | . | . | . |
| 12 | 10 | | . | . | . | . | . | . | . | . | . | . | 1 | . | . | . | . | . | . | . | . | . | . | . |
| 13 | 1 | | . | . | . | . | . | . | . | . | . | . | . | . | . | . | . | . | . | . | . | . | . | . |
| 16 | 2 | | . | . | . | . | . | . | . | . | . | . | . | . | . | . | 1 | . | 1 | . | 1 | 1 | 1 | . |
| 17 | 3 | | . | . | . | . | . | . | . | . | . | . | . | . | . | . | 1 | . | 1 | . | 1 | 1 | 1 | . |
| 19 | 4 | | . | . | . | . | . | . | . | . | . | . | . | . | . | . | . | 1 | 1 | . | 1 | 1 | 1 | . |
| 20 | 5 | | . | . | . | . | . | . | . | . | . | . | . | . | . | . | . | 1 | 1 | . | 1 | 1 | 1 | . |
| 18 | 6 | | . | . | . | . | . | . | . | . | . | . | . | . | . | . | . | . | 1 | . | 1 | 1 | 1 | . |
| 21 | 7 | | . | . | . | . | . | . | . | . | . | . | . | . | . | . | . | . | 1 | . | 1 | 1 | 1 | . |
| 22 | 8 | | . | . | . | . | . | . | . | . | . | . | . | . | . | . | . | . | . | . | 1 | 1 | 1 | . |
| 14 | 9 | | . | . | . | . | . | . | . | . | . | . | . | . | . | . | . | . | . | . | 1 | 1 | 1 | . |
| 24 | 20 | | . | . | . | . | . | . | . | . | . | . | . | . | . | . | . | . | . | . | . | . | 1 | 1 |
| 25 | 1 | | . | . | . | . | . | . | . | . | . | . | . | . | . | . | . | . | . | . | . | . | . | 1 |
| 26 | 2 | | . | . | . | . | . | . | . | . | . | . | . | . | . | . | . | . | . | . | . | . | . | . |

Taking node 4 (row 2) from this matrix as an example, it can be seen that nodes 5, 9, 11, 12 and 13 (columns 5, 7, 9, 10 and 11) depend upon node 4. These nodes are the number of ancestors for each operator. As indicated above, the ancestors of a first operator are those operators which depend on the result of the first operator. The columns of the operator dependency matrix are also individually summed and stored in an array. The values in this array represent the number of descendants for each operator. The descendants of a first operator are those operators which must be completed before the first operator can be executed.

From the example above, the operator dependency matrix would be as follows (the rows and columns have been renumbered to be consecutive):

|      |     | Node |   |   |    |   |   |   |   |     |
|------|-----|------|---|---|----|---|---|---|---|-----|
|      |     |      |   |   | 1  | 2 | 2 | 1 | 2 |     |
|      |     | 5    | 8 | 9 | 8  | 1 | 2 | 1 | 4 |     |
|      |     |      |   |   | Col|   |   |   |   |     |
| Node | Row | 1    | 2 | 3 | 4  | 5 | 6 | 7 | 8 |     |
| 5    | 1   | .    | . | 1 | 1  | . | . | . | . | [2  |
| 8    | 2   | .    | . | 1 | 1  | . | . | . | . | 2   |
| 9    | 3   | .    | . | . | 1  | . | . | . | . | 1   |
| 11   | 4   | .    | . | . | .  | . | . | . | . | 0   |
| 18   | 5   | .    | . | . | .  | . | . | 1 | 1 | 2   |
| 21   | 6   | .    | . | . | .  | . | . | 1 | 1 | 2   |
| 22   | 7   | .    | . | . | .  | . | . | . | 1 | 1   |
| 24   | 8   | .    | . | . | .  | . | . | . | . | 0]  |
|      |     | [0   | 0 | 2 | 3  | 0 | 0 | 2 | 3]|     |

The array below the matrix is the ancestor array based on the operator dependency matrix. The array to the right of the matrix is the descendant array for the matrix.

In one embodiment, the number of ancestors of a particular node is used as a "stress" operator for that node. The stress operator is used to indicate a level of urgency associated with selection of a node for execution. In this instance, there is a greater urgency to select the node upon which many other nodes depend (i.e., one which has many ancestors) than a node upon which few others depend. This operator is referred to as a stress operator because selection of a node with a high level of urgency relieves a greater amount of "stress." The stress operator is used in the rating of operator pairs and the resulting selection of operator pairs for parallel execution.

The fourth step of the method is to create a symbol pair matrix. The matrix is n-by-n, where n is the number of symbols in the relevant block of the abstract syntax tree. The symbol pair matrix is initialized with zeros and is then updated with a rating for each pair of symbols. A symbol pair matrix for the example code is shown below.

|        |     | Symbol |   |   |   |   |   |   |
|--------|-----|--------|---|---|---|---|---|---|
|        |     | a      | b | c | d | e | f | g |
|        |     |        |   |   | Col.|  |   |   |
| Symbol | Row | 1      | 2 | 3 | 4 | 5 | 6 | 7 |
| a      | 1   | .      | . | 3 | 3 | 4 | . | . |
| b      | 2   | 3      | . | . | 4 | 3 | . | . |
| c      | 3   | 3      | 4 | . | . | 3 | . | . |
| d      | 4   | 4      | 4 | 3 | 3 | . | . | . |
| e      | 5   | .      | . | . | . | . | . | . |
| f      | 6   | .      | . | . | . | . | . | 1 |
| g      | 7   | .      | . | . | . | . | 1 | . |

Figure 4:
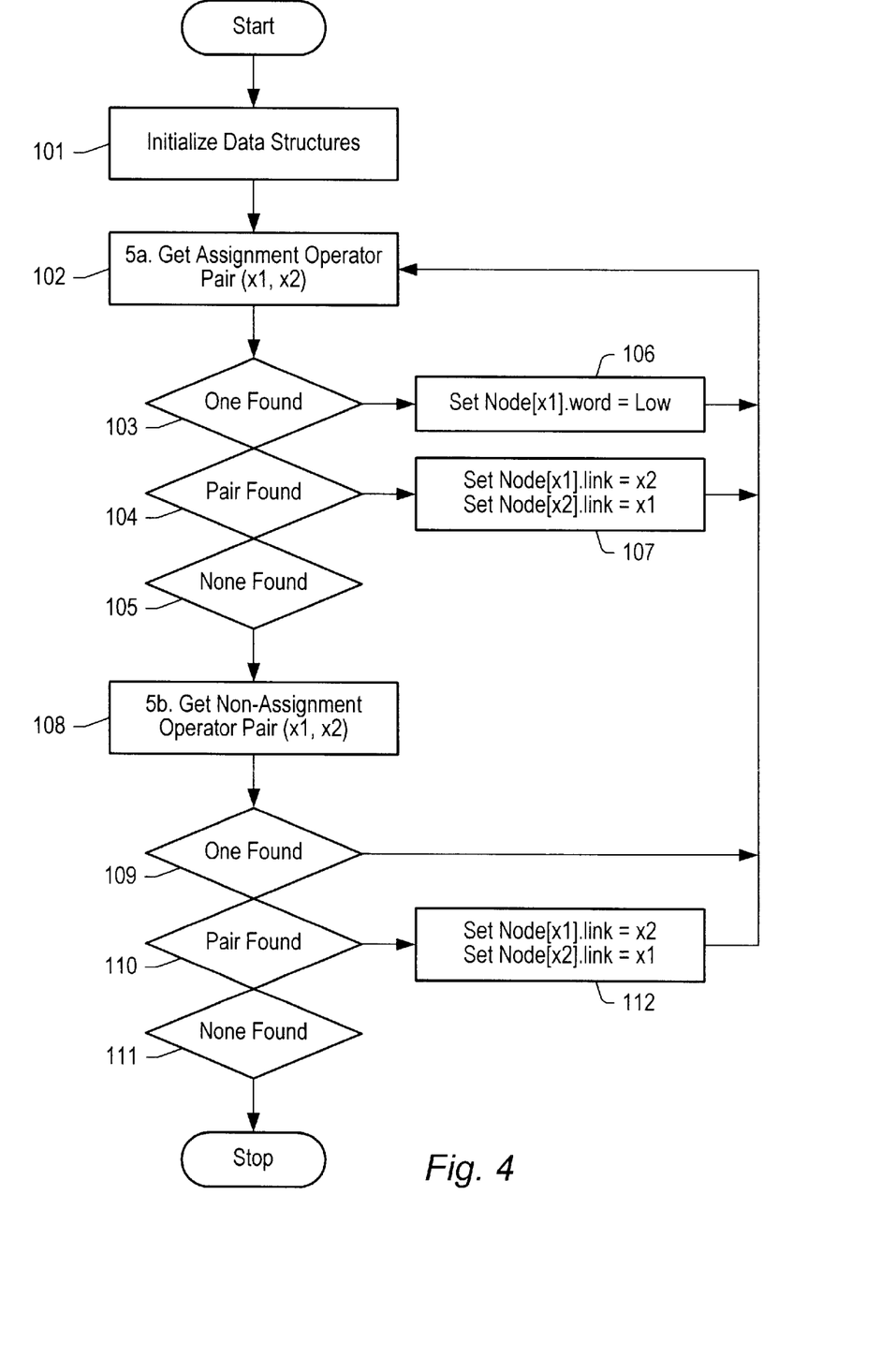
FIG. 4 is an expanded flow diagram corresponding to the selection of operator pairs in one embodiment.
Figure 5A:
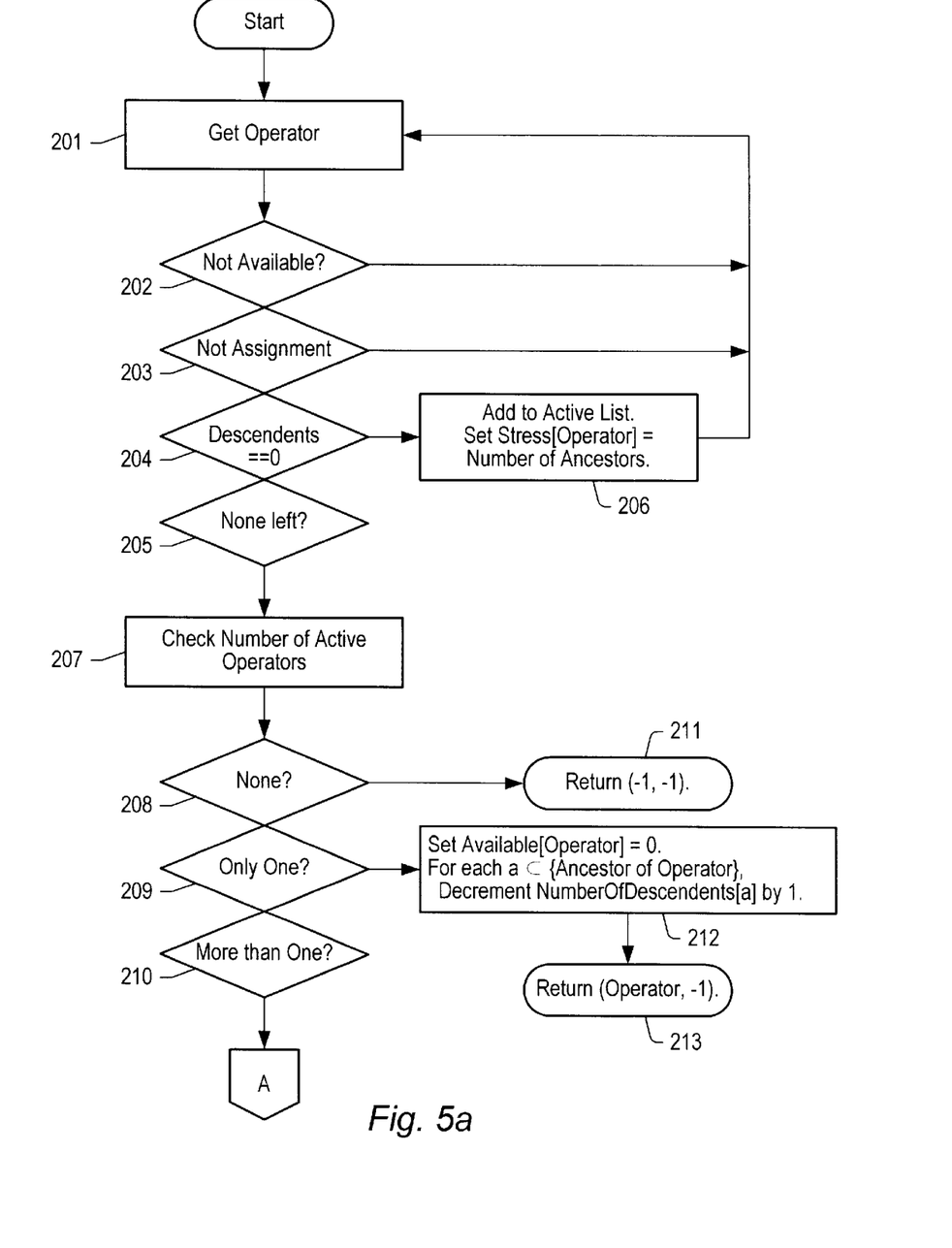
FIGS. 5a and 5b are expanded flow diagrams corresponding to the selection of assignment operator pairs in one embodiment.

The fifth step of the method is to select pairs of operators for execution in parallel. The selection of these operator pairs is shown in FIGS. 4 through 6*a*. Referring to FIG. 4, the selection of operator pairs begins with the initialization 101 of some of the data structures used in the selection of the operator pairs. (It should be noted that parts of some of the previous steps may overlap with the initialization of data structures 101 in FIG. 4.) After these data structures are initialized, the active operators are examined to determine which ones should be paired. As indicated by steps 102–107, available assignment operators are paired first in this embodiment. Available non-assignment operators are then paired (108–112.) The assignment operators are paired first because this effectively increases the priority of the assignment operators' ordering of the symbol values on which they operate. By maintaining the same ordering of the symbol values in subsequently paired operators, the need for instructions which do nothing more than reverse the order of the symbol values is eliminated and overhead is reduced. This will be described in more detail below.

If only one assignment operator is found 103, the word position of the operator's operands and result are assigned to low positions 106. After the operand/result position has been set to low, the active assignment operators are re-examined 102 for new pairs. If a pair of operators is found 104, each of the paired assignment operators is linked to the other 107. In this embodiment, the abstract syntax tree includes a "link" field for each node. The link field identifies another node which is linked to the current node for execution (i.e. which will be executed in the same vector instruction as the current node.) Thus, when the abstract syntax tree is scanned to generate object code, when the first operator of the pair is encountered, the second operator of the pair will be identified so that it can be included in a vector instruction with the first operator. After the pair of operators is linked, the active assignment operators are re-examined 102 for new pairs. If no active assignment operators are found 105, the active non-assignment operators are examined to identify pairs for vectorization.

At a high level, the method is essentially the same for non-assignment operators as it is for assignment operators. If a pair of non-assignment operators is found 110, the operators are linked by identifying each other in their respective link fields 112. The active assignment operators are then re-examined 102 as described above. If only a single non-assignment operator is found 109, the available assignment operators are re-examined. If no non-assignment operators are found 111, the selection of operator pairs for parallel (i.e., vector) execution is complete.

Figure 5B:
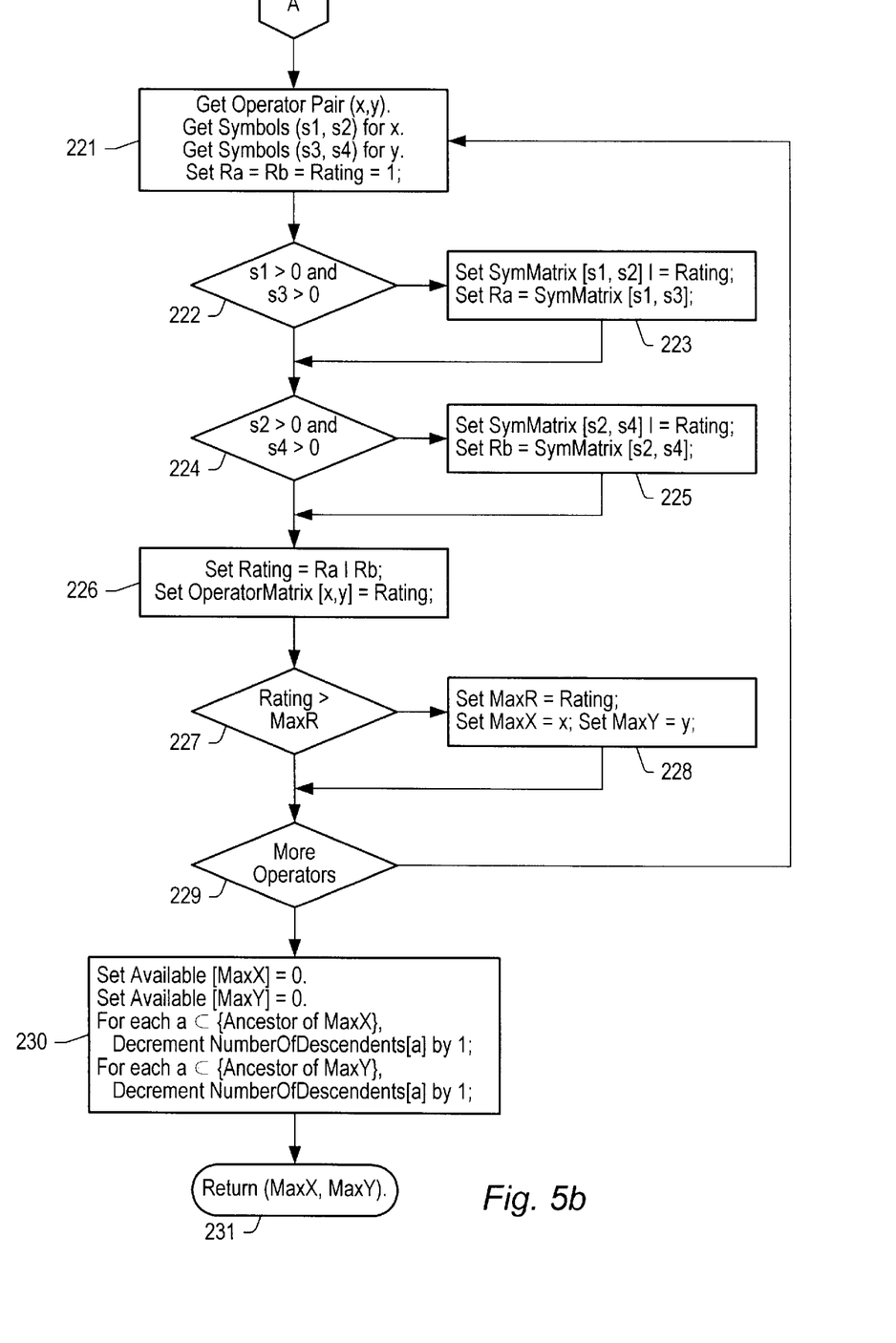

Referring to FIGS. 5*a* and 5*b*, the selection of assignment operator pairs corresponding to step 102 is shown in more detail. The primary function of steps 201 through 206 is to determine which assignment operators are active. "Active," as used herein indicates an operator which has no unaccounted-for operators upon which it depends. Put another way, it has no unresolved dependencies and is ready to be scheduled for execution. Until an operator is either paired with another operator for parallel execution or selected for individual execution, it remains active and no operator which depends upon its result can be scheduled for execution, individually or with another operator. It must therefore be determined which operators are active before it can be determined which of the operators can be executed in vector instructions.

As shown in the figure, the list of operators is traversed and each operator which is encountered is examined 201. If the operator is not available 202 or is not an assignment operator 203, the next operator in the list is found. If the operator is available and is an assignment operator, it is determined whether the operator is active. This is done by examining the descendant array to determine whether it has any unresolved descendants 204. (Although the descendant array is initialized with the number of descendants, the array maintains the number of descendants that have not yet been selected for execution, either individually or in parallel.) If it has no unresolved descendants, it added to the list of active operators 206 and an entry (a stress operator) is stored in a corresponding array to indicate the number of ancestors of the operator. The next operator in the operator list is then found and the procedure is repeated. When no operators are left 205, the method proceeds to check the number of active operators 207.

The function of steps 207 through 213 is to determine whether there are enough active operators to attempt to select a pair for parallel execution. The active list is first examined to determine the number of active assignment operators. If there are no active assignment operators 208, the method returns to step 102 and then falls through to step 108 for selection of a non-assignment operator pair. In one implementation, "(-1,-1)" is returned at step 102 to indicate that there are no active assignment operators. It only one assignment operator is identified 209, that operator is selected for individual execution. The selection is achieved by setting the availability of the operator to 0 in an availability array and decrementing the number of descendants for each of the operator's ancestors 212. (The availability array simply stores a value corresponding to each operator to indicate whether that operator is available — in this instance, a 1 indicates that the operator is available and a 0 indicates that the operator is not available.) "(Operator, -1)" is then returned 213, where "Operator" identifies the node number of the identified operator. The word position for this operator will be set to "low" and the operators will be re-examined for available operator pairs. If more than one assignment operator is identified 210, the method will proceed to examine these operators to determine whether any pairs are suitable for parallel execution as shown in FIG. 5a.

Referring to FIG. 5a, the steps for choosing an operator pair for parallel execution are shown. In steps 221 through 226, an operator pair is selected and a rating is assigned to that pair. The maximum rating of the examined operator pairs is tracked in steps 227 and 228. In steps 230 and 231, the operator pair with the highest rating is selected for parallel execution.

In the embodiment illustrated in FIG. 5a, the first pair of operators is selected 221. The symbols for the respective operators are also identified and the pair of dummy variables Ra and Rb are initialized for use in determining ratings for the operator pairs 221. The values stored in the symbol pair matrix for each of the identified symbols are examined to determine whether the symbols are valid 222, 224. If the first symbol for each operator is valid, a corresponding entry is stored in the symbol pair matrix 223. In this embodiment, the entry is formed by performing a bit-wise OR on the existing entry with a rating which has been initialized to 1. The dummy variables are then set to the respective values of the symbol pair matrix entries. The dummy variables are bitwise OR'd and the rating is updated with this value 226. The updated rating his stored in the operator pair matrix 226. If the rating is greater than the previous maximum rating for the current iteration, the rating and the operators are stored 228. If the rating is not greater than the previous maximum rating, a new pair of operators is selected for evaluation. If there are no more operator pairs to be evaluated 229, the operator pair corresponding to the highest rating is selected 230, 231. When the operator pair is selected, the operators are marked as unavailable and the number of descendants is modified for those operators which depend upon the selected pair.

Referring again to FIG. 4, for each pair of assignment operators which is selected for parallel execution, the nodes are linked together 107. A new pair is then selected 102. When there are no more assignment operator pairs that can be selected 105, a pair of non-assignment operators is selected 108. As noted above, the selection of non-assignment operator pairs proceeds in essentially the same manner as the selection of assignment operator pairs. After a non-assignment operator pair is selected, however, assignment operators again get priority, and any available assignment operator pairs are selected for parallel execution before further non-assignment pairs are selected.

Figure 6A:
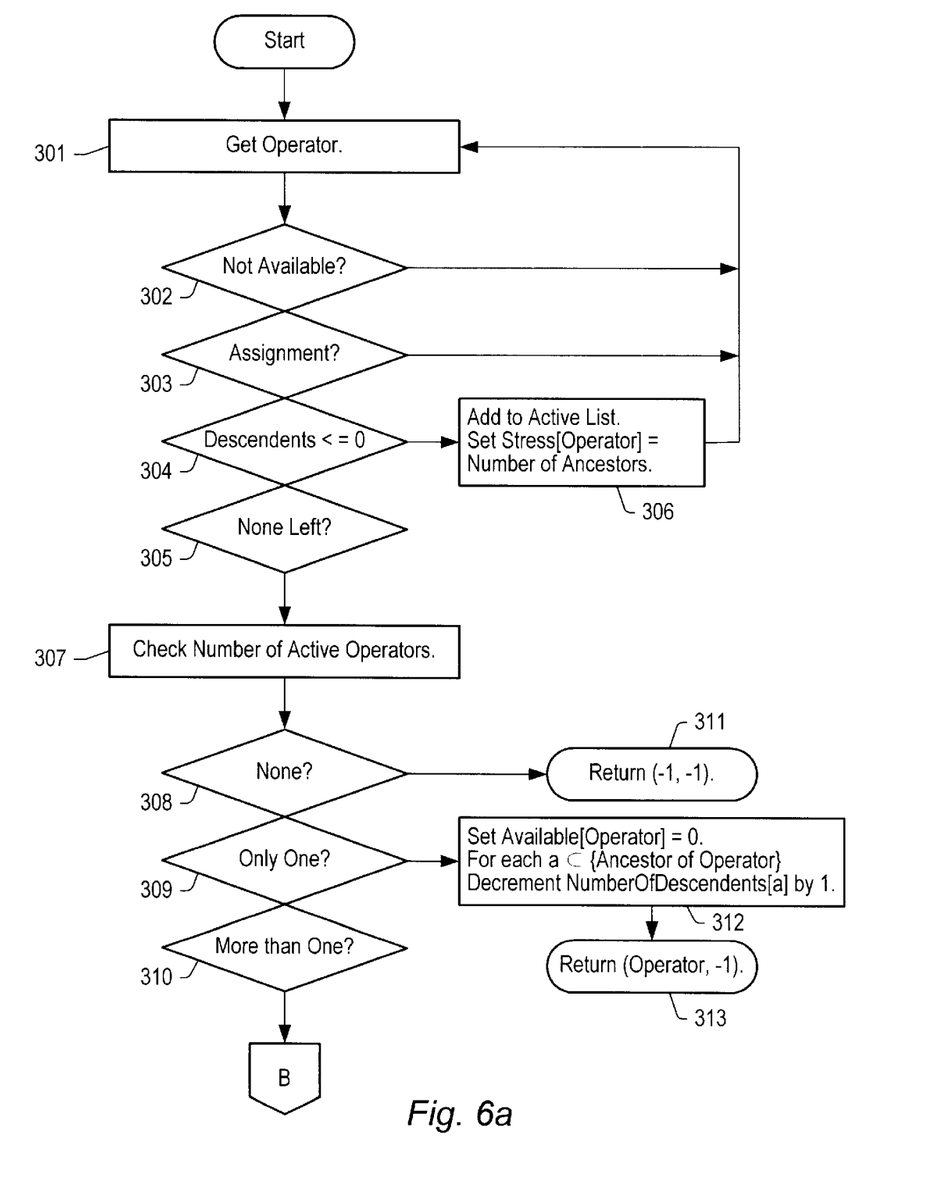
FIGS. 6a and 6b are expanded flow diagrams corresponding to the selection of non-assignment operator pairs in one embodiment.
Figure 6B:
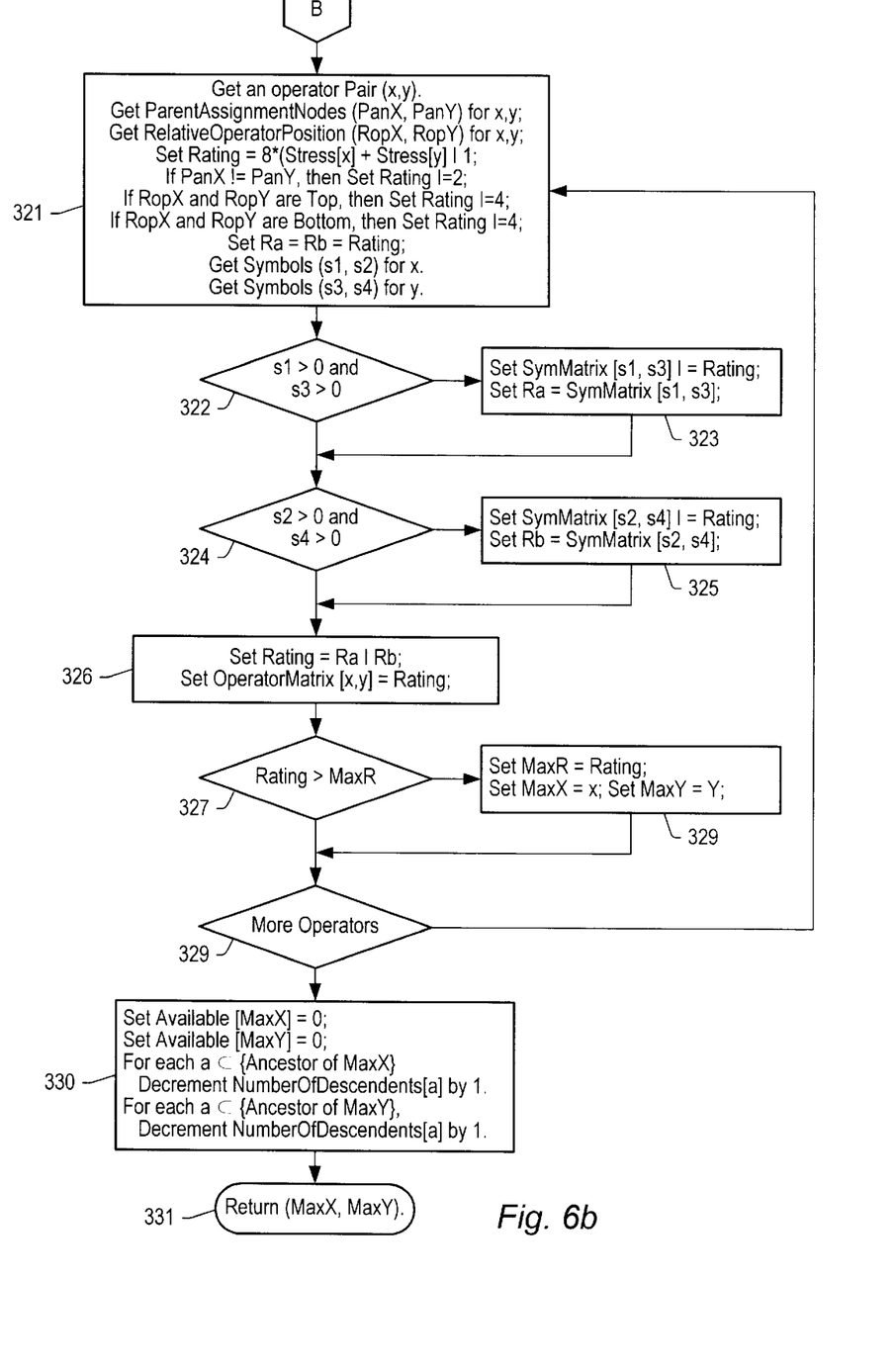

Referring to FIGS. 6a and 6b, the selection of non-assignment operator pairs is illustrated. In steps 301 through 306, active non-assignment operators are identified. In steps 307 through 313, the number of active non-assignment operators is determined. If there are no active non-assignment operators 308, "(-1,-1)" is returned 311. If there is only one active non-assignment operator 309, the operator is selected for individual execution and is marked as unavailable 312. For each of the operator's ancestors, the number of descendants is decremented by 1. If there are more than one non-assignment operators 310, the potential pairs of operators are evaluated to select a pair for parallel execution.

Similar to FIG. 5a, the first part of the flow diagram of FIG. 6a (steps 321 through 326) illustrate the rating of potential operator pairs, while steps 327 through 331 illustrate the tracking of the ratings and selection of the highest rated pair. The selection of non-assignment operator pairs differs primarily in the steps for rating the potential pairs. For example, the rating is updated with the value of a function of the stress operators described above. Here the function is the bitwise OR'ing of 1 and eight times the sum of the two stress functions. The rating is also updated by identifying the parent assignment nodes (Pan) of an operator pair and, if the operators have different parent assignment nodes, taking the bitwise OR of the rating with 2. Similarly, the relative operator positions (Rop) (Top or Bottom) for the operators are identified and, if the operators have the same relative operator position, the rating of the pair is bitwise OR'd with 4.

As each operator pair is evaluated, its rating is compared to the previous maximum rating 327 and, if it has a higher rating, the rating and the operators are stored 328. After all of the operator pairs have been evaluated, the highest rated pair is selected for parallel execution. The operators in the pair are identified as being unavailable and, for each of their ancestors, the number of descendants is decremented by 1 (see 330.) The selected pair is returned 331, and the operators of the pair are linked 112 for parallel execution.

Referring again to FIG. 4, steps 102 through 110 are repeated until all of the operators have been identified for either individual or parallel execution. The selection of operator pairs for parallel execution (illustrated in FIGS. 4 through 6a) is then complete. Referring again to FIG. 2, the method proceeds to the creation of a word dependency matrix. In this step, the abstract syntax tree is examined from the innermost levels to the outermost levels to determine word dependencies. That is, the dependencies of the operators are used, at least in part, to determine the dependencies between data words. Then, based primarily on the word dependency matrix and any mandatory word positions defined in step 106, each word is assigned to a high or low field. The pairs of symbols used by the paired operators are then defined as high pairs or low pairs. The pairs which have the highest values are the ones that define which pairs are high and which are low. Put another way, the pairs with the highest values get priority in the assignment of word positions. The high and low pair definitions are then used to determine relative addresses of the symbols in memory.

The assignment of a word to a high or low field may affect the performance of the vectorized operators. Take, for example, the equations $a=b+c$ $d=e+f$ $h=i+e$ $k=m+b$ The first two equations can be vectorized. In other words, [a,d]=[b,e]+[c,f]. The values for a, b and c can occupy either high or low word positions in their respective memory locations. Because the first two equations will be executed in parallel, d, e and f will occupy the other word position. That is, if a, b and c are high, d, e and f will be low; If a, b and c are low, d, e and f will be high. The parallel execution of the last two equations impacts the selection of high or low word positions of the first two equations because, since some of the data values are reused, it would be preferable for these data values to maintain the same word positions in both vectorized equations. For example, if a, b and c occupy high word positions, k, m and b should also occupy high word positions because b is common to both equations. If k, m and b were assigned to low word positions, b would have to be moved from a high position to a low position before the vector addition of the last two equations could be performed. This would add to the overhead of the code's execution and reduce its performance.

It should be noted that the the foregoing description is primarily directed to an embodiment which vectorizes instructions by selecting pairs of operations to be executed in parallel (i.e., it results in two-element vector instructions.) Other embodiments may select more than two operations to be executed in parallel. Two-element vectorization may be more efficiently utilized than n-element vectorization in some situations. For example, two identical operations may be efficiently vectorized in a single two-element instruction, while an eight-element instruction would have six unused elements. In other situations, it may be more efficient to use n-element vectorization. For example a 1000-iteration loop can be more efficiently performed eight instructions at a time than to instructions at a time. It is contemplated that embodiments of the invention may generate vector instructions having many elements, but that vector instructions having fewer elements may be more efficiently utilized to vectorize non-loop source code.

After the operations that can be executed in parallel are identified and the memory locations of the respective symbols are defined, the executable code can be generated. The abstract syntax tree is traversed to generate the code. As the abstract syntax tree is traversed, the link field of each operator is examined to determine whether it is to be executed in parallel with another operator and the symbols are examined to determine whether they are to be stored in particular memory locations. Otherwise, code generation proceeds as it would if the instructions were not to be vectorized.

While the present invention has been described with reference to particular embodiments, it will be understood that the embodiments are illustrative and that the invention scope is not limited to these embodiments. Many variations, modifications, additions and improvements to the embodiments described are possible. These variations, modifications, additions and improvements may fall within the scope of the invention as detailed within the following claims.

What is claimed is:

1. A method comprising examining one or more program instructions;

evaluating a plurality of operators within said instructions;

selecting one or more sets of said operators for parallel execution;

defining memory locations for a plurality of operands corresponding to said one or more sets of said operators, wherein said memory locations of operands corresponding to one of said sets of said operators are adjacent;

generating vector instructions for said one or more sets of said operators; and wherein said evaluating said plurality of operators includes rating each of said one or more potential sets of operators based upon a number of ancestor operators with which a given operator is associated.

2. The method of claim 1 wherein said memory locations are defined to minimize realignment of said plurality of operands.

3. The method of claim 1 wherein said program instructions include non-loop instructions and wherein said one or more sets of said operators include at least one operator corresponding to one of said non-loop instructions.

4. The method of claim 1 wherein selecting one or more sets of said operators for parallel execution comprises preferentially selecting assignment operators.

5. The method of claim 1 wherein evaluating said plurality of operators comprises evaluating operators having no unresolved dependencies.

6. The method of claim 1 wherein said rating each of said one or more potential sets of operators includes assigning a higher rating to a given potential set of operators having a higher number of ancestors than another potential set of operators, and wherein selecting said one or more sets for parallel execution comprises selecting one of said one or more potential sets which has a highest rating.

7. The method of claim 1 wherein each of said operators in said selected sets has at least one associated operand, and wherein said method further comprises, for each selected set, allocating adjacent memory locations for each of said operands associated with said each selected set.

8. A computer readable storage medium having instructions recorded therein, wherein said instructions are operable to:

examine a block of program code;

evaluate a plurality of operators within said block of program code;

select one or more sets of said operators for parallel execution;

define memory locations for a plurality of operands corresponding to said one or more sets of said operators, wherein said memory locations of operands corresponding to one of said sets of said operators are adjacent;

generate vector instructions for said one or more sets of said operators; and wherein said instructions are further operable to rate each of said one or more potential sets of operators based upon a number of ancestor operators with which a given operator is associated.

9. A method for selecting operators in a computer program for parallel execution, the method comprising:

(a) examining a plurality of operators;

(b) determining a rating corresponding to each of a plurality of sets of said plurality of operators, wherein said rating is based upon a number of ancestor operators with which a given operator is associated;

(c) identifying one of said plurality of sets having a highest rating; and (d) selecting said identified set for parallel execution.

10. The method of claim 9 wherein said instructions comprise non-loop instructions.

11. The method of claim 9 further comprising repeating (a) through (d).

12. The method of claim 11 further comprising generating executable code from said identified sets.

13. The method of claim 9 wherein examining said plurality of operators comprises identifying ones of said operators that have no unresolved dependencies and selecting said plurality of sets from said ones of said operators that have no unresolved dependencies.

14. The method of claim 13 wherein identifying ones of said operators that have no unresolved dependencies comprises forming an array that indicates a number of descendants of each of said operators and decrementing said number of descendants when a descendant of said each operator is selected for execution.

15. The method of claim 14 wherein forming said array comprises forming an operator dependency matrix and summing the columns of said operator dependency matrix, wherein the sum of each column indicates a first number of operators upon which a corresponding operator depends.

16. The method of claim 15 further comprising performing transitive closure on said operator dependency matrix.

17. The method of claim 14 further comprising, for each of said operators that depends on said identified set, decrementing said corresponding first number.

18. The method of claim 13 wherein determining said ratings and identifying said one of said plurality of sets having said highest rating comprises: determining said ratings for a plurality of assignment operators and identifying a set of assignment operators, then determining said ratings for a plurality of non-assignment operators and identifying a set of non-assignment operators.

19. The method of claim 9 wherein said ancestor operators depend upon a result of said given operator.

* * * * *